(12) United States Patent
Aurongzeb et al.

(10) Patent No.: US 10,592,038 B2
(45) Date of Patent: Mar. 17, 2020

(54) METHOD AND APPARATUS FOR MANAGING TOUCH FUNCTIONALITY IN A REPETITIVELY FLEXIBLE DEVICE

(71) Applicant: DELL PRODUCTS, LP, Round Rock, TX (US)

(72) Inventors: Deeder M. Aurongzeb, Austin, TX (US); Stefan Peana, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 22 days.

(21) Appl. No.: 15/874,368

(22) Filed: Jan. 18, 2018

(65) Prior Publication Data

US 2018/0143735 A1    May 24, 2018

Related U.S. Application Data

(63) Continuation of application No. 14/517,151, filed on Oct. 17, 2014, now Pat. No. 9,891,742.

(51) Int. Cl.
*G06F 3/041* (2006.01)
*G06F 1/16* (2006.01)

(52) U.S. Cl.
CPC .......... *G06F 3/0416* (2013.01); *G06F 1/1643* (2013.01); *G06F 2203/04103* (2013.01)

(58) Field of Classification Search
CPC ................. G06F 1/1643; G06F 3/0416; G06F 2203/04103
See application file for complete search history.

(56) References Cited

U.S. PATENT DOCUMENTS

| 6,819,316 | B2 | 11/2004 | Schulz et al. |
| 9,180,646 | B2 | 11/2015 | Kim et al. |
| 2013/0265257 | A1* | 10/2013 | Jung ............... G06F 3/0412 345/173 |
| 2014/0255667 | A1 | 9/2014 | Kim et al. |
| 2015/0074597 | A1 | 3/2015 | Etuaho |

(Continued)

OTHER PUBLICATIONS

"Flexible Screens Get Touchy-Feely," Graham-Rowe, MIT Technology Review, Feb. 27, 2009; http://www.technologyreview.com/news/412322/flexible-screens-get-touchy-feely/.

(Continued)

*Primary Examiner* — Charles V Hicks
(74) *Attorney, Agent, or Firm* — Larson Newman, LLP (57) ABSTRACT

A method, information handling system, and display assembly utilizes wherein a first touch panel indication is detected, and it is determined whether the first touch panel indication is from a defined bending area or from a defined non-bending area. When the first touch panel indication is from the defined bending area, it is determined if there is a second touch panel indication from an other touch sensor element adjacent to the first touch sensor element. When there is a simultaneous second touch panel indication, the touch location is interpolated based on the locations of the first and the other touch sensor elements. When there is a sequential second touch panel indication, the touch location is extrapolated based on locations of the first and the other touch sensor elements and a sequence of the first touch panel indication and the second touch panel indication.

20 Claims, 6 Drawing Sheets

(56) References Cited

U.S. PATENT DOCUMENTS

2015/0277496 A1   10/2015   Reeves et al.

OTHER PUBLICATIONS

"Enhanced Optical Transparency; Optical Transparent GEL," Taica Corporation product features; Sep. 22, 2014; http://www.taica.co.jp/gel-english/products/use/index06.html.
"ClearOhm® Silver Nanowire Coating Material," Cambrios Technologies Corp, Oct. 2, 2014; http://www.cambrios.com/technology.

* cited by examiner

METHOD AND APPARATUS FOR MANAGING TOUCH FUNCTIONALITY IN A REPETITIVELY FLEXIBLE DEVICE

CROSS-REFERENCE TO RELATED APPLICATION

This application is a continuation of U.S. patent application Ser. No. 14/517,151 entitled "Method and Apparatus for Managing Touch Functionality in a Repetitively Flexible Device," filed on Oct. 17, 2014, the disclosure of which is hereby expressly incorporated by reference in its entirety.

FIELD OF THE DISCLOSURE

The present disclosure generally relates to information handling systems, and more particularly relates to managing touch functionality in a repetitively flexible device.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
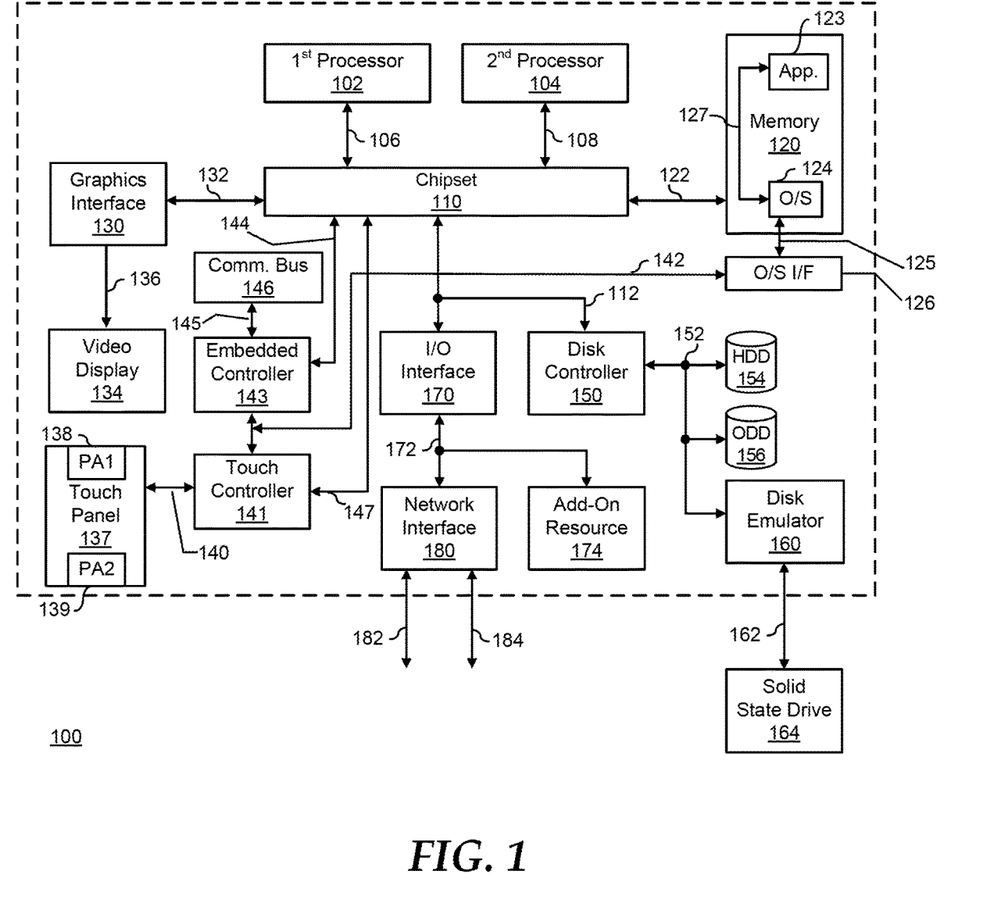
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

Memory 120 can store and provide retrieval of, for example, application software 123 and operating system software 124. Application software 123 can interact with operating system software 124, as illustrated by linkage 127. The operating system software 124 can access, and be accessed by, other system elements via mechanisms other than memory bus 122. For example, operating system interface 126 can enable such access, as illustrated by linkage 125. Operating system interface 126 can communicate with other system elements, such as embedded controller 143 and touch controller 141 via operating system interface bus 142.

Embedded controller 143 is connected to chipset 110 via embedded controller bus 144. Embedded controller 143 is connected to a communication bus 146 via connection 145. Embedded controller 143 is connected to touch controller 141 via operating system bus 142. Touch controller 141 is connected to chipset 110 via touch controller bus 147. Touch controller 141 is connected to touch panel 137 via touch panel bus 140. Touch panel 137 is sensitive to touch over a plurality of areas, such as a first primary area 138 and a second primary area 139. Touch panel 137 can be sensitive to touch over additional areas, such as a secondary area. Touch panel 137 can be disposed parallel to and physically aligned with video display 134, allowing the touching of objects, such as icons, displayed on video display 134 to be detected and localized.

Disk controller 150 and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
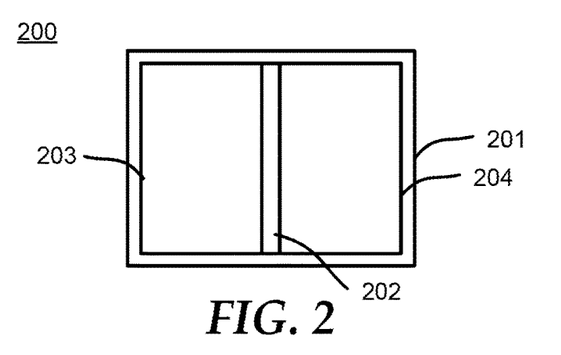
FIG. 2 is a plan view diagram illustrating an information handling system in a flat physical configuration according to an embodiment of the present disclosure.

FIG. 2 is a plan view diagram illustrating an information handling system in a flat physical configuration according to an embodiment of the present disclosure. Information system 200 includes housing 201 and a display assembly that includes first primary area 203, second primary area 204, and secondary area 202. Secondary area 202 is defined to be a defined bending area, where the display assembly is intended to bend. First primary area 203 and second primary area 204 are each defined to be a defined non-bending area, where the display assembly is not intended to bend.

Figure 3:
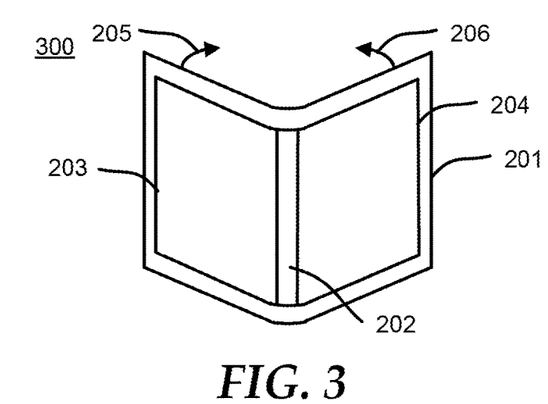
FIG. 3 is a perspective view diagram illustrating an information handling system in a flexed physical configuration according to an embodiment of the present disclosure.

FIG. 3 is a perspective view diagram illustrating an information handling system in a flexed physical configuration according to an embodiment of the present disclosure. Information handling system 300 includes the housing 201 and the display assembly of FIG. 2, but housing 201 and the display assembly have been bent at an obtuse angle in the directions depicted by arrows 205 and 206. As illustrated, the bending occurs along secondary area 202, which is a defined bending area, not along first primary area 203 and second primary area 204, which are defined non-bending areas.

Figure 4:
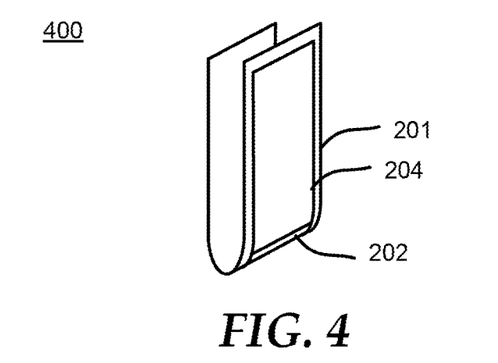
FIG. 4 is a perspective view diagram illustrating an information handling system in a folded physical configuration according to an embodiment of the present disclosure.

FIG. 4 is a perspective view diagram illustrating an information handling system in a folded physical configuration according to an embodiment of the present disclosure. Information handling system 400 includes the housing 201 and the display assembly of FIGS. 2 and 3, but housing 201 and the display assembly have been bent at an acute angle with a radius of curvature at the bend, which lies along secondary area 202, which is a defined bending area. Second primary area 204, which is a defined non-bending area, remains unbent, as does first primary area 203 (not shown in FIG. 4, but on an opposite side of information handling system 400 from second primary area 204.

Existing technology for a display assembly having a touch panel is incompatible with repetitive flexure. Brittle materials, such as glass and indium titanium oxide (ITO) tend to fracture and fail with flexure, especially repetitive flexure. Other elements of an existing display assembly are also ill-suited for flexure, and tolerate only slight flexure.

Figure 5:
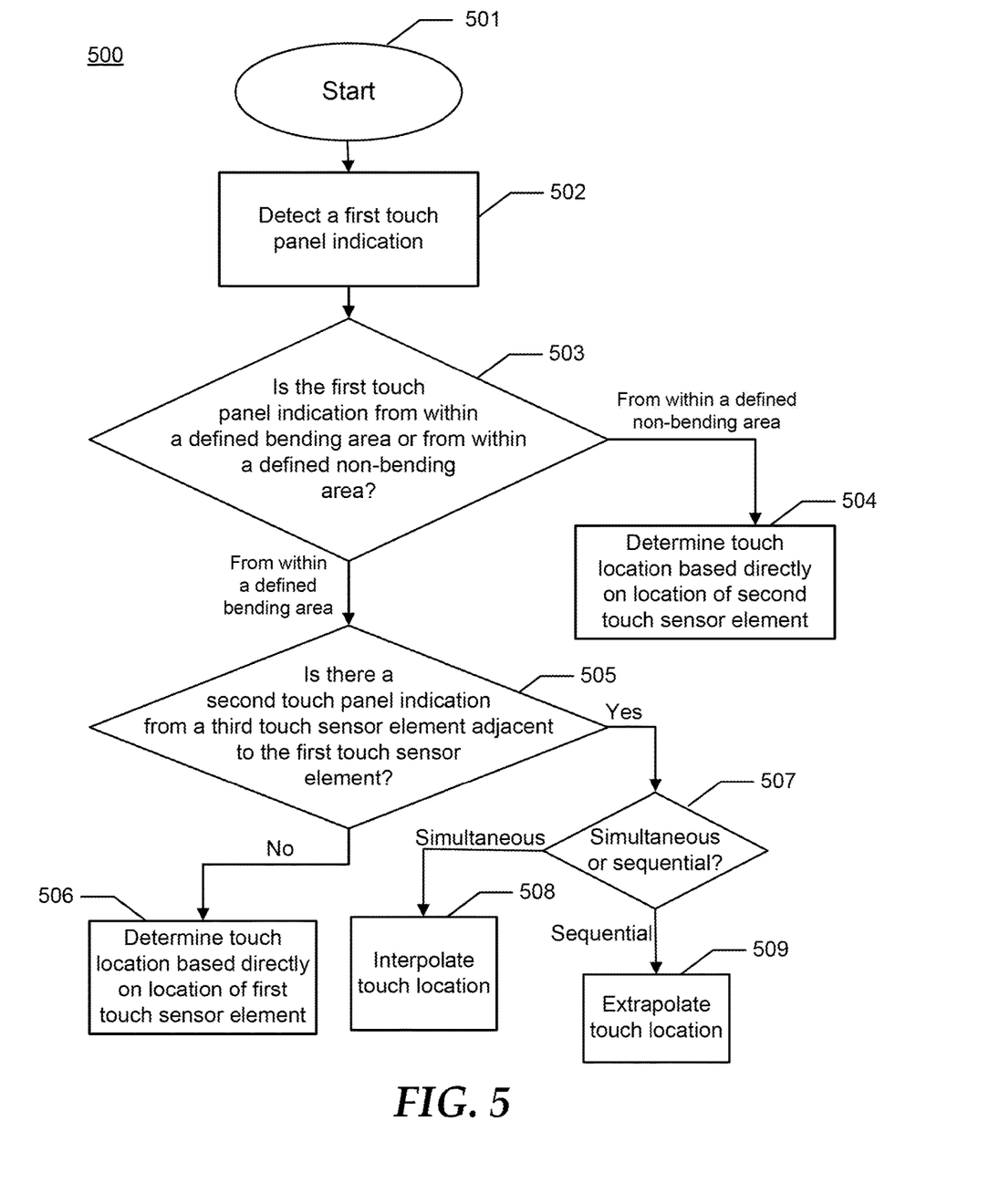
FIG. 5 is flow diagram illustrating a method according to an embodiment of the present disclosure.

FIG. 5 is flow diagram illustrating a method according to an embodiment of the present disclosure. Method 500 begins in block 501. From block 501, method 500 continues to block 502. In block 502, a first touch panel indication is detected. From block 502, method 500 continues to decision block 503. In decision block 503, a decision is made as to whether the first touch panel indication is from a first touch sensor element within a defined bending area between two defined non-bending areas of a display assembly comprising a touch panel or from a second touch sensor element within one of the two defined non-bending areas. If the first touch panel indication is from a second touch sensor element within one of the two defined non-bending areas, method 500 continues to block 504. In block 504, the touch location is determined based directly on the location of the second touch sensor element. If the first touch panel indication is from a first touch sensor element within a defined bending area, method 500 continues to decision block 505. In decision block 505, a decision is made as to whether there is a second touch panel indication from a third touch sensor element adjacent to the first touch sensor element. If not, method 500 continues to block 506. In block 506, the touch location is determined based directly on the location of the first touch sensor element. If there is a second touch panel indication from a third touch sensor element adjacent to the first touch sensor element, method 500 continues to decision block 507. In decision block 507, a decision is made as to whether the first touch panel indication and the second touch panel indication occurred simultaneously or sequentially. If the first touch panel indication and the second touch panel indication occurred simultaneously, method 500 continues to block 508. In block 508, the touch location is determined by interpolating between the location of the first touch sensor element and the location of the third touch sensor element. If the first touch panel indication and the second touch panel indication occurred sequentially, method 500 continues to block 509. In block 509, the touch location is determined by extrapolating beyond the location of the latter of the first touch panel indication and the second touch panel indication. For example, if the second touch panel indication occurs after the first touch panel indication occurs, the touch location is determined to be on a side of the location indicated by the second touch panel location opposite the location indicated by the first touch panel indication.

Figure 6:
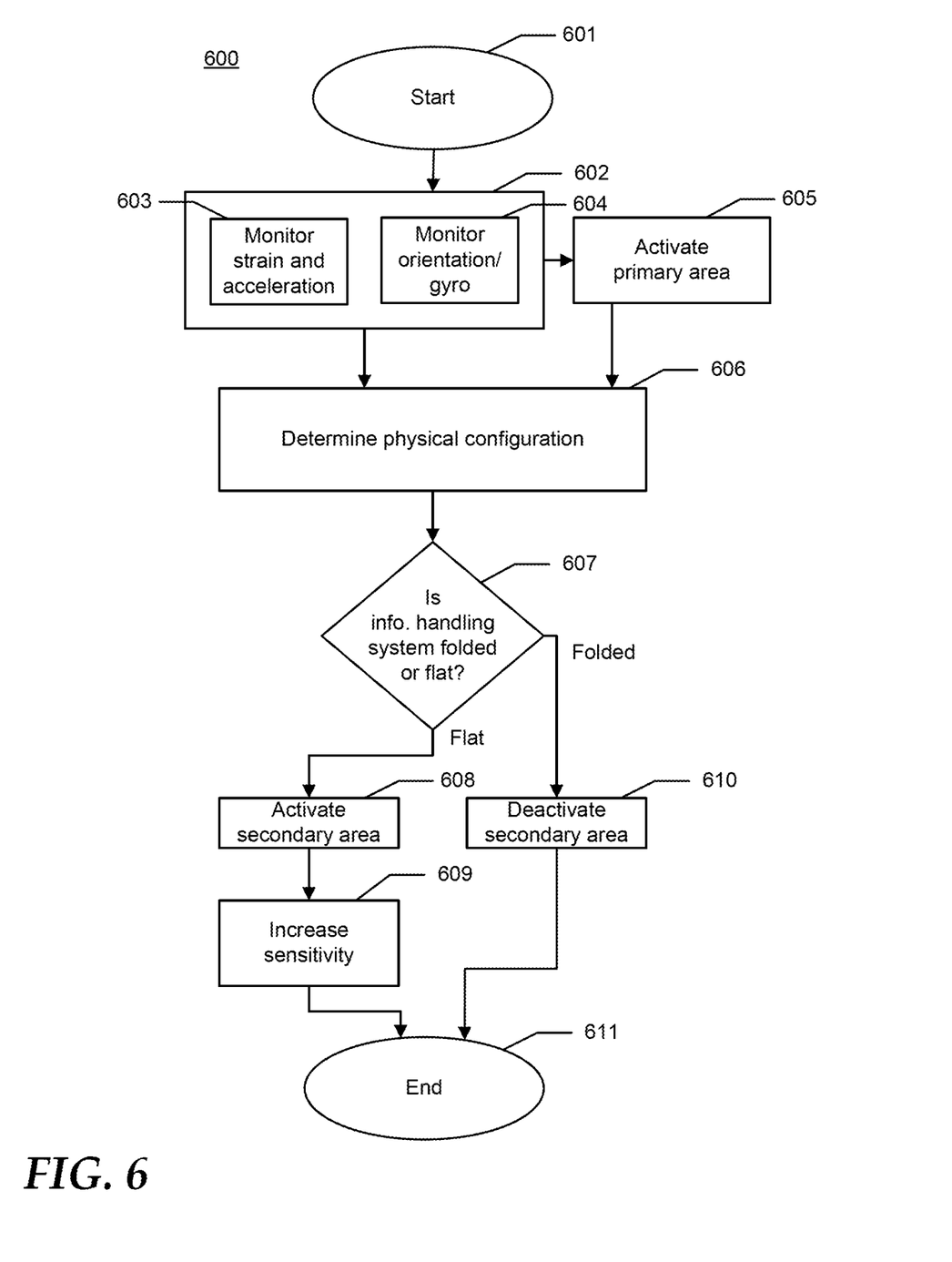
FIG. 6 is flow diagram illustrating a method according to an embodiment of the present disclosure.

FIG. 6 is flow diagram illustrating a method according to an embodiment of the present disclosure. Method 600 begins in block 601. From block 601, method 600 continues to block 602. In block 602, sensor outputs are received. As an example, in block 603, strain and acceleration sensors are monitored. As another example, in block 604, orientation and gyroscopic sensors are monitored. From block 602, method 600 can continue to block 605. In block 605, a primary area of the display assembly is activated. The primary area can be determined in response to the sensor outputs of block 602. From block 605, method 600 continues to block 606. In block 606, a physical configuration of the information handling system is determined. The sensor outputs of block 602 can be used to determine the physical configuration of the information handling system.

From block 606, method 600 continues to decision block 607. In decision block 607, a decision is made as to whether the information handling system is folded or flat. If the information handling system is determined to be folded, method 600 continues to block 610. In block 610, the secondary area is deactivated. Deactivating the secondary area can prevent spurious inputs from being received from the secondary area when the information handling system is folded. From block 610, method 600 continues to block 611, where method 600 ends. If, in decision block 607, the information handling system is determined to be flat (e.g., not folded), method 600 continues to block 608. In block 608, the secondary area is activated. From block 608, method 600 continues to block 609. In block 609, the sensitivity of the secondary area in increased. As an example, the sensitivity of the secondary area can be increased to compensate for a reduced sensor matrix density within the secondary area relative to the primary area. As an example, the sensitivity of the secondary area can be increased by interpolating between touch panel sensor elements of a portion of the secondary area. As another example, the sensitivity of the secondary area can be increased by extrapolating beyond touch panel sensor elements of a portion of the secondary area. From block 609, method 600 continues to block 611, where method 600 ends.

Figure 7:
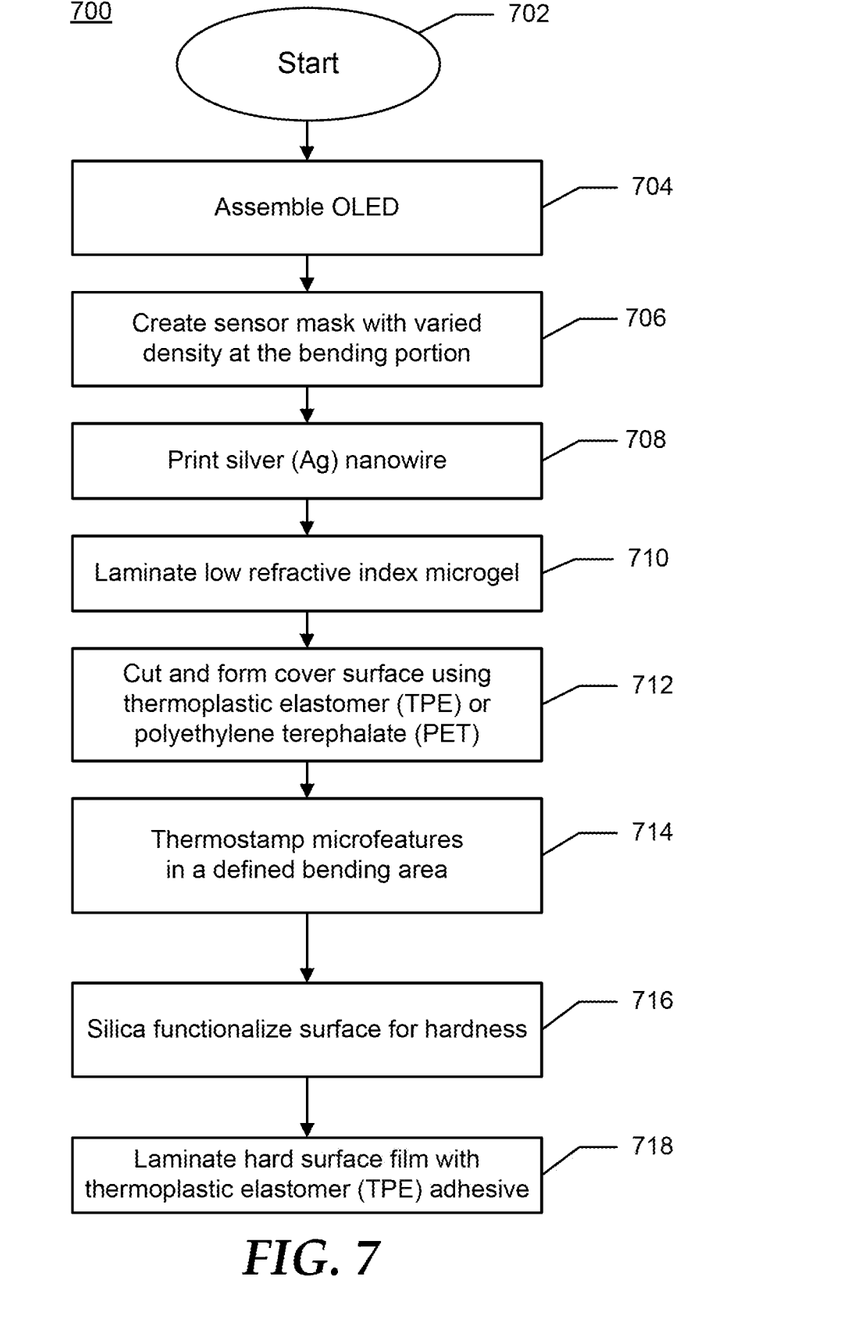
FIG. 7 is flow diagram illustrating a method of manufacture according to an embodiment of the present disclosure.

FIG. 7 is flow diagram illustrating a method of manufacture of a display assembly according to an embodiment of the present disclosure. Method 700 begins in block 702. From block 702, method 700 continues to block 704. In block 704, an organic light emitting diode (OLED) video display is assembled into a display assembly. From block 704, method 700 continues to block 706. In block 706, a touch panel sensor mask having varied touch panel sensor density, with lower density in a defined bending area than in a defined non-bending area, is introduced into the display assembly. From block 706, method 700 continues to block 708. In block 708, silver (Ag) nanowires are printed onto a surface within the display assembly, for example, a front surface of the OLED video display or, as another example, a rear surface of a surface film, wherein a front surface of the surface film provides an exposed front surface of the display assembly. From block 708, method 700 continues to block 710. In block 710, a low refractive index microgel is laminated into the display assembly. As an example, the low refractive index microgel can be laminated between the OLED video display and the sensor mask. As another example, the low refractive index microgel can be laminated between the OLED video display and the silver nanowires. As yet another example, the low refractive index microgel can be laminated between the sensor mask and a surface film. As a further example, the low refractive index microgel can be laminated between the silver nanowires and the surface film. From block 710, method 700 continues to block 712. In block 712, a surface film is cut and formed to provide a cover surface using, for example, thermoplastic elastomer (TPE) or polyethylene terephthalate (PET). From block 712, the method continues to block 714. In block 714, microfeatures are thermostamped into the surface film within a defined bending area. The microfeatures can be aligned with an expected bend location within the defined bending area. For example, the microfeatures can include embossed lines disposed along the expected bend location. From block 714, method 700 continues to block 716. In block 716, the exposed front surface of the surface film is silica functionalized to provide surface hardness, for example, by depositing a layer of microscopic silica particles on the exposed front surface. From block 716, method 700 continues to block 718. In block 718, the surface film, for example, a hard surface film, is laminated to the display assembly using a thermoplastic elastomer (TPE) adhesive.

Figure 8:
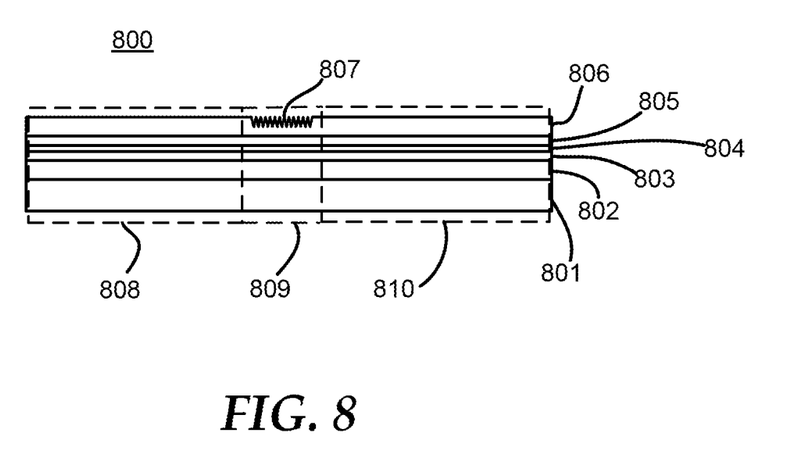
FIG. 8 is an elevation view diagram illustrating a display assembly according to an embodiment of the present disclosure.

FIG. 8 is an elevation view diagram illustrating a display assembly according to an embodiment of the present disclosure. Display assembly 800 includes a flexible substrate 801. For example, flexible substrate 801 can include an aramid material, a unidirectional (UD) carbon fiber material, a graphene material, a thermoplastic elastomer, polyethylene terephthalate (PET), or several of the foregoing materials. Thermoplastic elastomers for implementing flexible substrate 801 can include, as an example, a polyamide or polyimide film with high elasticity. One example of such a polyimide film, for example, is Langley Research Center Colorless Polyimide 2 (LaRC-CP2) film. Other examples of suitable thermoplastic elastomers include copolyesters, polyurethanes, polyamides, polyimides, and thermoplastic elastomer blends & alloys (for example, thermoplastic polyolefins and thermoplastic vulcanizates). In accordance with at least one embodiment, layered aramid having a thickness of greater than 0.2 mm and thermoplastic vulcanizates are used to produce a composite flexible substrate having a thickness of up to 0.8 mm. Display assembly 800 includes an OLED video display 802 located above and parallel to flexible substrate 801. Display assembly 800 includes a touch panel 804 located above and parallel to OLED video display 802. Display assembly 800 can include a microgel layer 803 between OLED video display 802 and touch panel 804. Display assembly 800 includes a surface film 806. Examples of suitable materials for surface film 806 include colorless TPE films, which can include the examples described above with respect to flexible substrate 801, and polyethylene terephthalate (PET). Display assembly 800 can include a microgel layer 805 between touch panel 804 and surface film 806. As an example, the microgel layers 803 and 805 can be made from ALPHA GEL available from Taica Corporation, Takanawa Sengakuji-ekimae Bldg. 3F, 2-18-10 Takanawa, Minato-ku, Tokyo 108-0074, Japan. Surface film 806 includes microfeatures 807 formed on an exposed surface of surface film 806. Microfeatures 807 are formed within a defined bending area 809 of display assembly 800 but not within defined non-bending areas 808 and 810 of display assembly 800. Microfeatures 807 can have thin valleys and ridges, as shown in FIG. 8, or other suitable shapes, such as thin cuts between flat strips, as will reduce the stress of bending on surface film 806.

In accordance with at least one embodiment, nanowires are screen printed to form a bendable touch sensor array. This touch sensor array is printed on film and laminated on a display using low durometer polymer, such a silicone dydrogel, so that the display assembly can accommodate bending. For example, 10,000 to 20,000 cycles of bending with a 1 cm bend radius can be accommodated. Even if some wear occurs at the bending point, such wear can be accommodated by wear tolerant features. One wear tolerant feature involves changing the touch sensor element density at the bending point to reduce stress and increasing the touch sensor element sensitivity to maintain touch panel functionality and resolution. Another wear tolerant feature involves using a three segment sensor, leaving the bending point sensor free. Based on a direction of swipe and application, software in an embedded controller can provide seamless interaction by interpolating or extrapolating a touch position from available information even over a sensor free region.

In accordance with at least one embodiment, materials assembly and touch sensor control by a controller allow touch panel utilization over a flat region even as another region of the touch panel may or may not be flat. For example, display assembly including a touch panel uses nanowire based sensor elements with varied sensor element density, including lower density at the folding point or in other areas where the tension and compression are the highest. A low refractive index microgel, such as a silicone dydrogel, is used at an interface between display assembly elements to tolerate bending. The top cover, such as a surface film, is stamped, for example, using thermostamping, which involves sufficient heat to cause the top cover to flow under the pressure of stamping, at a micron level so that compression of bending is dissipated. An example of suitable nanowire material is CLEAROHM silver nanowire coating from Cambrios Technologies Corporation, 930 East Argues Ave., Sunnyvale, Calif. 94085. In accordance with at least one embodiment, brittle materials, such as ITO and other brittle oxide materials are avoided and not included in the display assembly. The touch sensitivity at a specific location, such as within a defined bending region, is managed based on orientation and which portion of the display assembly is active for a given device configuration.

In accordance with at least one embodiment, the touch panel does not include a continuous transparent oxide layer. As an example, the touch panel does not include a transparent oxide layer continuously coextensive with an entire region occupied by the touch panel. In accordance with at least one embodiment, the touch panel includes a plurality (for example, two or three) of segments of transparent oxide layer for touch functionality while allowing bending to occur between the segments. As an example, the touch panel includes a discontinuous plurality of transparent oxide layers arranged in a coplanar configuration when the touch panel is in a flat mode. Joints between the discontinuous regions of the layers are oriented linearly to form lines along which bending can occur without subjecting the transparent oxide layers to excessive stress. As an example, one or more transparent oxide layers can be limited in extent to not exceed an entire defined non-bending area. Each defined non-bending area may be provided with its own one or more transparent oxide layers such that no transparent oxide layer of a defined non-bending area crosses a defined bending area. In accordance with at least one embodiment, one or more transparent oxide layers separate from any transparent oxide layer of a defined non-bending area may be disposed in a defined bending area, provided any such one or more transparent oxide layer is of a size and shape compatible with the defined bending area. For example, one or more transparent oxide layers disposed in a defined bending area may be thinner and of a smaller area than a transparent oxide layer disposed in a defined non-bending area.

In one example embodiment, the touch sensor elements in the defined bending area are spaced with greater separation so that stress is low even when the display assembly is bent. In this case, the cover plastic, such as a surface film, can be saw-tooth grooved or of a reduced thickness within at least a portion of the defined bending area, for example, by micro-stamping features so that bending stress is minimal on the surface and on the sensors.

In another example embodiment, the touch sensor element array is separated and discontinuous at the highest curvature point and touch continuity is managed by a controller based on information received from touch sensor elements on one or both sides of the gap between touch sensor elements within the defined bending area. Given a swipe direction, as identified by a controller, the touch function is extrapolated beyond existent touch sensor elements to provide touch location determination even in a region devoid of touch sensor elements. It is also possible to increase sensor sensitivity at the controller, thereby providing a proximity mode for scroll or swipe operations.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations. In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method, comprising:
   receiving outputs generated by touch sensors associated with a touch panel display, the touch sensors generating the outputs responsive to a touch input to the touch panel display;
   determining that the touch sensors are located along a bendable spine of the touch panel display, the bendable spine separating a front cover and a back cover;
   in response to determining that the outputs are substantially simultaneously generated by the touch sensors located along the bendable spine, interpolating a location associated with the touch input; and
   in response to determining that the outputs are sequentially generated by the touch sensors located along the bendable spine, extrapolating the location associated with the touch input.

2. The method of claim 1, further comprising determining locations of the touch sensors.

3. The method of claim 2, wherein the interpolating of the location associated with the touch input is based on the locations of the touch sensors.

4. The method of claim 1, further comprising determining the location associated with the touch input is outside the bendable spine of the touch panel display.

5. The method of claim 1, further comprising determining the location associated with the touch input is opposite one of the touch sensors located along the bendable spine.

6. The method of claim 1, further comprising determining the touch panel display is folded based on the outputs generated by the touch sensors.

7. The method of claim 1, further comprising determining the touch panel display is flat based on the outputs generated by the touch sensors.

8. An information handling system comprising:
 a processor;
 a display assembly coupled to the processor, the display assembly comprising a bendable spine separating a rigid non-bending front cover and a rigid non-bending back cover; and
 a memory device storing instructions that when executed cause the processor to perform operations, the operations including:
 receiving outputs generated by touch sensors associated with the display assembly, the touch sensors generating the outputs responsive to a touch input to the display assembly;
 determining the touch sensors are located along the bendable spine;
 in response to determining that the outputs are substantially simultaneously generated by the touch sensors located along the bendable spine, interpolating a location associated with the touch input to the display assembly; and
 in response to determining that the outputs are sequentially generated by the touch sensors located along the bendable spine, extrapolating the location associated with the touch input to the display assembly.

9. The information handling system of claim 8, wherein the operations further include determining locations along the bendable spine of the touch sensors.

10. The information handling system of claim 9, wherein the operations further include basing the interpolating of the location associated with the touch input on the locations along the bendable spine of the touch sensors.

11. The information handling system of claim 8, wherein the operations further include determining the location associated with the touch input is outside the bendable spine.

12. The information handling system of claim 8, wherein the operations further include determining the location associated with the touch input is opposite one of the touch sensors located along the bendable spine.

13. The information handling system of claim 8, wherein the operations further include determining the touch panel display is folded based on the outputs generated by the touch sensors.

14. The information handling system of claim 8 wherein the operations further include determining the touch panel display is flat based on the outputs generated by the touch sensors.

15. A memory device storing instructions that when executed cause a hardware processor to perform operations, the operations comprising:
 receiving outputs generated by touch sensors associated with a display assembly, the touch sensors generating the outputs responsive to a touch input to the display assembly;
 determining the touch sensors are located along a bendable spine of the touch panel display, the bendable spine separating a rigid non-bending front cover and a rigid non-bending back cover;
 in response to determining that the outputs are substantially simultaneously generated by the touch sensors located along the bendable spine, interpolating a location associated with the touch input along the bendable spine; and
 in response to determining that the outputs are sequentially generated by the touch sensors located along the bendable spine, extrapolating the location associated with the touch input along the bendable spine.

16. The memory device of claim 15, wherein the operations further include determining locations along the bendable spine of the touch sensors.

17. The memory device of claim 16, wherein the operations further include basing the interpolating of the location associated with the touch input on the locations associated with the touch sensors located along the bendable spine.

18. The memory device of claim 15, wherein the operations further include determining the location associated with the touch input is outside the bendable spine of the touch panel display.

19. The memory device of claim 15, wherein the operations further include determining the location associated with the touch input is opposite one of the touch sensors located along the bendable spine.

20. The information handling system of claim 8, wherein the operations further include determining the touch panel display is at least one of i) folded based on the outputs generated by the touch sensors and ii) flat based on the outputs generated by the touch sensors.

* * * * *